United States Patent
Meyer et al.

(10) Patent No.: US 9,057,397 B2
(45) Date of Patent: Jun. 16, 2015

(54) CHROME-PLATED FASTENER WITH ORGANIC COATING

(75) Inventors: David C. Meyer, Boston, NY (US); Thomas R. Lanham, Boston, NY (US); Shane A. Hartman, Boston, NY (US)

(73) Assignee: McGard LLC, Orchard Park, NY (US)

( * ) Notice: Subject to any disclaimer, the term of this patent is extended or adjusted under 35 U.S.C. 154(b) by 655 days.

(21) Appl. No.: 12/888,148

(22) Filed: Sep. 22, 2010

(65) Prior Publication Data

US 2012/0070249 A1 Mar. 22, 2012

(51) Int. Cl.
*F16B 33/06* (2006.01)
*B05D 5/08* (2006.01)
*B05D 7/16* (2006.01)

(52) U.S. Cl.
CPC ............... *F16B 33/06* (2013.01); *B05D 5/083* (2013.01); *B05D 7/16* (2013.01); *B05D 2258/00* (2013.01); *B05D 2350/65* (2013.01)

(58) Field of Classification Search
CPC .... F16B 33/06; B05D 5/083; B05D 2258/00; B05D 7/16; B05D 2350/65
USPC ................... 411/411, 427, 914, 424; 427/258
See application file for complete search history.

(56) References Cited

U.S. PATENT DOCUMENTS

| | | | | |
|---|---|---|---|---|
| 2,438,877 A | * | 3/1948 | Spruance, Jr. ................ | 148/258 |
| 2,562,117 A | * | 7/1951 | Osdal ............................ | 148/251 |
| 2,741,288 A | * | 4/1956 | Johnson ........................ | 411/259 |
| 3,113,845 A | * | 12/1963 | Uchida et al. ................ | 428/626 |
| 3,801,354 A | * | 4/1974 | Rist ............................... | 428/463 |
| 3,841,896 A | * | 10/1974 | Boggs et al. .................. | 428/220 |
| 3,853,606 A | * | 12/1974 | Parkinson ..................... | 428/461 |
| 3,985,916 A | * | 10/1976 | Church et al. ................ | 427/543 |
| 4,266,975 A | * | 5/1981 | Higashiyama et al. ...... | 106/1.12 |
| 4,407,900 A | * | 10/1983 | Kirihara et al. .............. | 428/659 |
| 4,799,959 A | * | 1/1989 | Fourez et al. ................ | 106/1.16 |
| 4,837,090 A | * | 6/1989 | Hyner et al. .................. | 428/626 |
| 4,960,653 A | * | 10/1990 | Yokoi ........................... | 428/613 |
| 4,964,774 A | * | 10/1990 | Lat et al. ...................... | 411/446 |
| 4,975,337 A | * | 12/1990 | Hyner et al. .................. | 428/648 |
| 5,096,352 A | | 3/1992 | Lemelson | |
| 5,149,237 A | * | 9/1992 | Gabriel et al. ............... | 411/446 |
| 5,275,892 A | * | 1/1994 | Hyner et al. .................. | 428/648 |
| 5,332,348 A | | 7/1994 | Lemelson | |
| 5,482,746 A | * | 1/1996 | Liberti et al. ................ | 427/379 |
| 5,614,037 A | * | 3/1997 | Keener ......................... | 148/537 |
| 5,707,113 A | * | 1/1998 | Russell ..................... | 301/37.375 |

(Continued)

OTHER PUBLICATIONS

TechPlate, Decorative Copper-Nickel-Chromium, Welcome to TechPlate, Inc. Tooling, molds and firearms our specialty, available at http://web.archive.org/web/20010308233706/http://techplate.com/chrome2.htm, web archive date: Mar. 8, 2001.*

(Continued)

*Primary Examiner* — Gay Ann Spahn
(74) *Attorney, Agent, or Firm* — Walter W. Duft

(57) ABSTRACT

An organic-coated, chrome-plated fastener includes a fastener body having one or more friction regions that are adapted to slidably engage another structure when the fastener is used for fastening. Some or all of the fastener body may be chrome-plated, including at least one of the friction regions. The at least one chrome-plated friction region may be coated with an organic composition that is selected to control a coefficient of friction of the at least one chrome-plated friction region.

19 Claims, 6 Drawing Sheets

(56) References Cited

U.S. PATENT DOCUMENTS

| | | | |
|---|---|---|---|
| 5,753,316 A * | 5/1998 | Brent et al. | 427/486 |
| 5,858,133 A * | 1/1999 | Keener | 148/537 |
| 5,922,472 A * | 7/1999 | Keener | 428/472.2 |
| 5,944,918 A * | 8/1999 | Keener | 148/251 |
| 6,171,649 B1 * | 1/2001 | Keener et al. | 427/213 |
| 6,221,177 B1 * | 4/2001 | Keener | 148/275 |
| 6,274,200 B1 * | 8/2001 | Keener et al. | 427/318 |
| 6,403,230 B1 * | 6/2002 | Keener | 428/460 |
| 6,475,610 B1 * | 11/2002 | Keener et al. | 428/213 |
| 6,494,972 B1 * | 12/2002 | Keener et al. | 148/529 |
| 6,599,071 B1 | 7/2003 | McCauley et al. | |
| 6,953,509 B2 * | 10/2005 | Keener | 148/537 |
| 7,128,949 B2 * | 10/2006 | Keener et al. | 427/385.5 |
| 7,275,465 B2 * | 10/2007 | Maznicki | 81/436 |
| 7,597,935 B2 * | 10/2009 | Xu et al. | 427/409 |
| 7,655,320 B2 * | 2/2010 | Keener et al. | 428/626 |
| 8,137,755 B2 * | 3/2012 | Keener et al. | 427/388.2 |
| 8,534,407 B2 * | 9/2013 | Koda et al. | 180/219 |
| 2002/0127083 A1 | 9/2002 | Ando et al. | |
| 2003/0039527 A1 * | 2/2003 | Schatz | 411/9 |
| 2003/0205481 A1 * | 11/2003 | Xu et al. | 205/319 |
| 2004/0163740 A1 * | 8/2004 | Keener et al. | 148/537 |
| 2004/0247835 A1 * | 12/2004 | Keener | 428/160 |
| 2005/0118337 A1 * | 6/2005 | Keener et al. | 427/299 |
| 2005/0175785 A1 * | 8/2005 | Hentsch et al. | 427/402 |
| 2005/0193877 A1 * | 9/2005 | Maznicki | 81/900 |
| 2006/0046080 A1 * | 3/2006 | Keener et al. | 428/457 |
| 2006/0141242 A1 * | 6/2006 | Keener | 428/334 |
| 2006/0201228 A1 * | 9/2006 | Rothenberger | 72/393 |
| 2009/0324363 A1 * | 12/2009 | Abbott et al. | 411/378 |
| 2010/0104858 A1 * | 4/2010 | Horio et al. | 428/331 |
| 2011/0117380 A1 * | 5/2011 | Sugawara et al. | 428/612 |
| 2011/0142567 A1 * | 6/2011 | Haylock et al. | 411/360 |
| 2012/0052319 A1 * | 3/2012 | Sugawara et al. | 428/613 |
| 2012/0070249 A1 * | 3/2012 | Meyer et al. | 411/411 |

OTHER PUBLICATIONS

Carpenter Technical Articles, Coating Tools of High Strength, High Tough Steel Produce up to 100 Times More Powder Metal Parts, Jun. 1998.*

WIPO, "International Search Report and Written Opinion of International Searching Authority", counterpart International Application No. PCT/US2011/026223, Nov. 24, 2011, 8 pages.

The Magni Group, Inc., "Magni Engineered Coatings", Aug. 12, 2008, 2 pages.

The Magni Group, Inc., "Construction Fasteners", Apr. 28, 2008, 3 pages.

The Magni Group, Inc., "Magni Europe", downloaded from <http://www.magnieurope.com> on May 28, 2010, 3 pages.

The Magni Group, Inc., "Magni Europe Magni 565-System", downloaded from <http://www.magnieurope.com> on May 28, 2010, 1 page.

Magni Industries, Inc., "Material Safety Data Sheet, B18", Aug. 16, 2007, 5 pages.

G. Shaw, "The Nuts & Bolts of Cadmium Plating Alternatives", Automotive Finishing, Spring 1999, 10 pages.

NOF Metal Coatings North America, "Geomet Coatings, A Completely Chromium-Free Coating", downloaded from <http://www.geomet.net> on May 26, 2010, 2 pages.

R. Taylor, "NMFRC, National Metal Finishing Resource Center, Ask the Expert Question-and-Answer Archive (Hard Chrome Plating)", Jun. 2007, 2 pages.

* cited by examiner

CHROME-PLATED FASTENER WITH ORGANIC COATING

BACKGROUND

1. Field

The present disclosure relates to chrome-plated fasteners, including, bolts, nuts and other coupling members.

2. Description of the Prior Art

By way of background, chrome-plated fasteners are used in fastener applications where the decorative properties of the chrome plating are desired. Such applications include, but are not limited to, automotive wheel fasteners such as lug bolts and lug nuts. Unfortunately, chrome plating increases a fastener's coefficient of friction, which can lead to galling and seizing, causing the plating to inevitably wear away and thereby expose the underlying metal to environmental degradation. Commonly owned U.S. Pat. No. 6,599,071 discloses a technique for selectively plating only the portions of a fastener that remain exposed to view when the fastener is installed. The fastener's non-exposed portions, such as the threads and the seat, receive a protective coating (typically a zinc-rich composition) that is suitable for these friction regions. Although this technique works well, the selective plating process is more complicated than the conventional approach in which plating is applied to the entire fastener.

SUMMARY

An organic-coated, chrome-plated fastener includes a fastener body having one or more friction regions that are adapted to slidably engage another structure when the fastener is used for fastening. Some or all of the fastener body may be chrome-plated, including at least one of the friction regions. The at least one chrome-plated friction region may be coated with an organic composition that is selected to control a coefficient of friction of the region.

According to example embodiments, the organic coating may comprise a cured resin containing a metal particulate and a friction modifier. For example, the cured resin may comprise an epoxy, the metal particulate may comprise aluminum, and the friction modifier may comprise polytetrafluoroethylene (PTFE). In a particular embodiment, the organic coating may be provided by a chrome-free aluminum-rich organic composition designed to be applied to an inorganic zinc-rich basecoat. The organic composition may comprise (by weight) 33.0-35.0% propylene glycol monomethyl ether acetate (PMA), 6.0-8.0% polytetrafluoroethylene (PTFE), 4.0-6.0% aluminum, 4.0-6.0% n-butyl alcohol, 3.0-5.0% dimethyl glutarate, 1.0-3.0% magnesium oxide, 1.0-3.0% aromatic petroleum distillate, 0.0-2.0% Stoddard solvent and <1.0% naphthalene.

According to further example embodiments, the organic coating may have a thickness of between approximately 0.00008-0.0005 inches. The chrome plating layer may be microporous in nature and the organic coating may adhere to the at least one chrome-plated friction region at a 5B adhesion strength rating using ASTM D3359-09 Method B adhesion testing.

In one example embodiment, the fastener may be configured as a bolt having a bolt head and a threaded shank. The bolt may be entirely chrome-plated and the organic coating may cover a threaded portion of the shank that represents a chrome-plated friction region. The bolt may further comprise a seat that is either an integral part of the bolt body or is mounted on the shank as a seat washer. In either case, the seat may be entirely chrome-plated and the organic coating may cover a portion of the seat that comprises a chrome-plated friction region.

In other example embodiment, the fastener may be configured as a nut having a nut head, a seat and a threaded bore. The head and the seat may be chrome-plated and the threaded bore may be optionally chrome plated. The organic coating may covering a portion of the seat that comprises a chrome-plated friction region. The organic coating may also covering the threaded bore if the threaded bore is a chrome-plated friction region.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
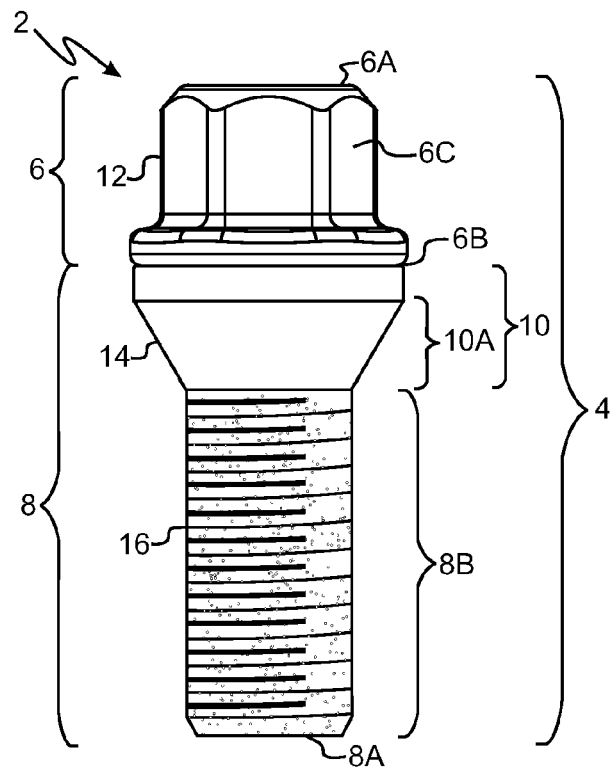
FIG. 1 is a side elevation view showing a bolt type of fastener.
Figure 2:
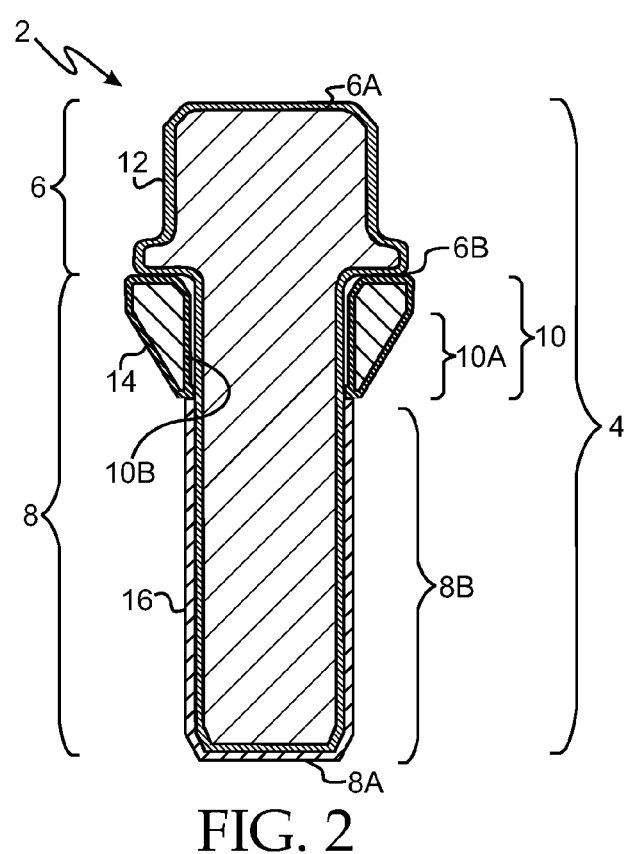
FIG. 2 is a cross-sectional centerline view of the bolt fastener of FIG. 1.

Turning now to FIGS. 1 and 2, a bolt-type fastener 2 according to a first example embodiment is shown. The fastener 2 includes a fastener body 4 having a bolt head 6 and a shank 8. The bolt head 6 includes an end face 6A that defines a first end of the body 4. The bolt head 6 further includes a flanged base 6B and a sidewall portion 6C extending between the end face 6A and the base 6B. As best shown in FIG. 2, the shank 8 extends from the bolt head's base 6B and continues to a terminal end 8A of the shank that defines a second end of the body 4. The shank 8 includes a threaded portion 8B that extends from the terminal end 8A toward the base 6B for a suitable distance that may span some or all of the length of the shank. The shank's threaded portion 8B is configured to be received in a threaded bore of a fastener installation structure. One such structure could be the threaded bore TB of the vehicle hub H in the example vehicle wheel installation shown in FIG. 3. Note that the profiles of individual threads on the shank 8 and the threaded bore TB are not shown in FIGS. 2 and 3 for ease of illustration.

The sidewall portion 6C of the bolt head 6 provides a tool engaging portion of the fastener 2. In the illustrated embodiment, the sidewall portion 6C is formed with a six-sided hexagonal configuration for receiving a socket wrench, an end wrench, or other conventional tool. Other standard bolt head designs, such as a four-sided configuration, may also be used for the sidewall portion 6C. Alternatively, the sidewall portion 6C could be configured for use with a specialized security tool. For example, the sidewall portion 6C could be generally cylindrical but formed with a security lock pattern (e.g., longitudinal grooves) arranged to be engaged by a matching key having a corresponding security key pattern (e.g., longitudinal ridges). In a further alternative configuration (not shown) the end face 6A of the bolt head 6 could provide the tool engaging portion of the fastener 2 and the sidewall portion 6C could be formed without a tool-engaging configuration. For example, the end face 6A could be configured with a security lock pattern (e.g., a serpentine groove) arranged to be engaged by a matching key having a corresponding security key pattern (e.g., a serpentine ridge). The sidewall portion 6C according to such an embodiment could then have a smooth generally cylindrical (or frustoconical) face that cannot be easily gripped for engagement by a conventional tool.

A tapered seat washer 10 is slideably mounted on the shank 8 and positioned to abut the base 6B of the bolt head 6. The seat washer 10 is an independent structure that includes a tapered outer surface 10A that is generally cone-shaped. As shown in FIG. 2, the seat washer also includes an internal bore 10B that fits loosely on the bolt shank 8. The seat washer's tapered surface 10A is configured to engage a matching tapered counterbore formed in a fastener installation structure. One such structure could be the counterbore CB of the vehicle wheel W shown in the example vehicle wheel installation of FIG. 3. In lieu of the seat washer surface 10A being cone-shaped, other configurations, such as a radiused profile, could also be used.

As can be best seen in FIG. 2, the body 4 of the fastener 2 may be entirely covered with a chrome-plated coating 12 that is applied using a suitable electroplating technique. Alternatively, although not shown, portions of the body 4 (such as the head 6) could be selectively plated while other areas are not. The chrome-plated coating 12 may comprise any desired number of plating layers, including (without limitation) one or more copper and/or nickel underlayers followed by one or more chromium outer layers. Other chrome-plating materials and layer arrangements may also be used. Note that reference numeral 12 generically represents any and all such plating layers. Individual plating layers are not shown for ease of illustration. The tapered seat washer 10 may also be covered with its own chrome-plated coating 14 that may be applied using the same type of electroplating technique used to chrome-plate the fastener body 4. Alternatively, the seat washer 10 could be covered with a different type of decorative coating, such as a PVD (physical vapor deposition) coating. The seat washer 10 could also be covered with a non-decorative coating, such as a zinc-rich coating (e.g., zinc, zinc-nickel, etc.) or an aluminum-rich coating.

As described by way of background above, chrome plating can be problematic when applied to fastener threads, seats and other friction regions that slidably engage another structure. The threaded portion 8B of the shank 8 represents one friction region of the fastener 2 because it is designed to frictionally engage a mating threaded portion of a fastener installation structure, such as the threaded bore TB of the vehicle hub H shown in FIG. 3. During installation and removal of the fastener 2, high friction forces are generated at the fastener's threaded portion 8B due to its sliding contact with the threaded bore as the fastener rotates. As previously stated, the tapered seat washer 10 is also designed to engage a mating structure, namely the counterbore of a fastener installation structure, such as the counterbore CB of the vehicle wheel W shown in FIG. 3. Because the seat washer 10 is supposed to spin loosely on the shank 8 of the body 4 when the fastener is installed or removed, it may or may not represent a friction region of the fastener 2. Whether or not the seat washer 10 is a friction region will depend on whether and to what extent the tapered surface 10A slides relative to the opposing counterbore.

The fastener 2 thus includes at least one, and possible two (or more) friction regions that may be subject to large frictional forces. In order to allow the friction region(s) of the fastener 2 to be chrome-plated without causing problems such as galling, seizing and plating wear, at least one friction region (and preferably all such regions) may be coated with an organic composition that is selected to control each region's coefficient of friction. FIGS. 1-2 shows a construction wherein the threaded portion 8B of the shank 8 is coated with the organic composition, which is shown by reference number 16. Although not shown, the tapered surface 10A of the seat washer 10 could also be coated with the organic composition if it is anticipated that this surface will develop friction forces in excess of a desired coefficient of friction. By applying the organic coating 16 over the chrome-plated coating(s) in only the friction regions where the fastener's torque-tension properties must be controlled, other areas of the fastener 2 can maintain a decorative appearance. Moreover, the chrome-plating operation can be simplified because the friction regions do not have to be masked to prevent chrome-plating layer deposition thereon.

The organic coating 16 may be applied as a resin containing a metal particulate and a friction modifier that is cured until hardened. By way of example, the resin may comprise an epoxy, the metal particulate may comprise aluminum, and the friction modifier may comprises a polytetrafluoroethylene (PTFE) lubricating agent.

One material that may be used as the organic coating 16 is sold under the designation B18 by Magni Industries, Inc. of Detroit Mich. The B18 product is a chrome-free, aluminum-rich organic composition designed to be applied to an inorganic zinc-rich basecoat. Different grades of the B18 product are available depending on the required coefficient of friction. As far as known, the B18 material is not designed for application to chrome-plated surfaces and such usage is contraindicated by the product literature (which specifies a chrome-free, zinc basecoat). According to the Material Safety Data Sheet (MSDS) for the B18 product, the material comprises (by weight) 33.0-35.0% propylene glycol monomethyl ether acetate (PMA) (CAS Reg. No. 108-65-6), 6.0-8.0% polytetrafluoroethylene (PTFE) (CAS Reg. No. 9002-84-0), 4.0-6.0% aluminum (CAS Reg. No. 7429-90-5), 4.0-6.0% n-butyl alcohol (CAS Reg. No. 71-36-3), 3.0-5.0% dimethyl glutarate (CAS Reg. No. 1119-40-0), 1.0-3.0% magnesium oxide (CAS Reg. No. 1309-48-4), 1.0-3.0% aromatic petroleum distillate (CAS Reg. No. 64742-94-5), 0.0-2.0% Stoddard solvent (CAS Reg. No. 8052-41-3) and <1.0% naphthalene (CAS Reg. No. 91-20-3). The remaining 31.0-37.0% balance of the B18 product is proprietary to the manufacturer and not known to applicants. Other known resin systems that could potentially be used in the organic coating 16 include, but are not necessarily limited to, acrylic resins, acrylic-epoxy resins, phenoxy resins, polyester resins and urethane resins.

The organic coating 16 may be applied to at least one friction region of the fastener 2 using a conventional technique such as dipping, spinning or spraying, following by heat curing. For the B18 material described above, a curing temperature of approximately 390-420° F., and more preferably approximately 400° F., may be applied for approximately 25 minutes or as otherwise required. It will be appreciated that other time/temperature curing regimes may be required for other coating materials. The thickness of the organic coating 16 is preferably between approximately 0.00008-0.0005 inches, and more preferably between approximately 0.0002-0.0005 inches. These thicknesses are small in order to control thread size. Other coating thicknesses could no doubt also be used depending on design preferences.

In order to be usable in practical applications, good adhesion must be developed between the organic coating 16 and the underlying chrome-plated coating 12. In adhesion tests performed using ASTM D3359-09 Method B, chrome-plated fasteners coated with the B18 material described above were found to adhere to the chrome-plated fastener surfaces at a 5B adhesion strength rating. This is the highest adhesion rating specified by the aforementioned ASTM testing procedure. In the samples that were tested, the chrome-plated coating 12 was formed with three nickel-plated sublayers and a single chrome-plated outer layer. The third nickel-plating layer was applied using a conventional microporous nickel strike process in which a solid additive was incorporated into the nickel bath to produce micropores. This resulted in the final chrome-plated layer being microporous. The minimum micropore density was approximately 64,000 pores/sq. in. The smallest counted pore was no smaller than 1/10 the size of the largest pore. The target pore size average diameter was not in excess of approximately 0.00125 inches. Other pore densities and pore sizes could potentially also be used to achieve acceptable adhesion levels. Moreover, it is anticipated that other plating techniques, such as those which produce a microcracked chrome plating layer, could also be used.

Figure 4:
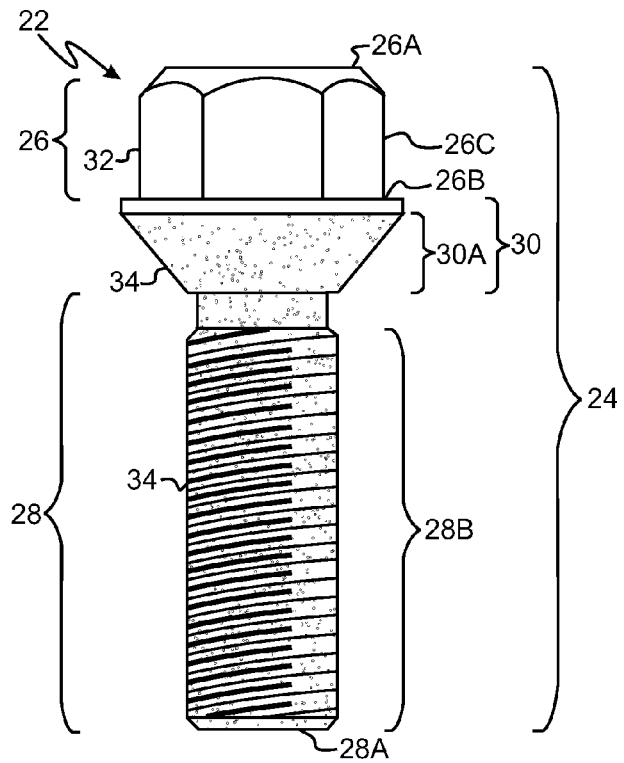
FIG. 4 is a side elevation view showing another bolt type of fastener.
Figure 5:
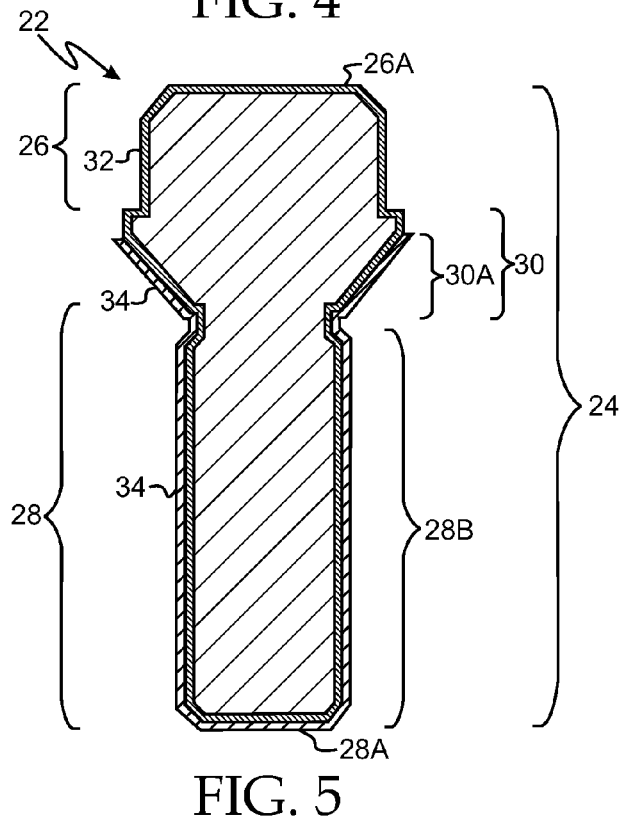
FIG. 5 is a cross-sectional centerline view of the bolt fastener of FIG. 4.

Turning now to FIGS. 4-5, an alternative bolt-type fastener 22 according to a second embodiment is shown. The fastener 22 is formed with a fastener body 24 that includes a bolt head 26, a shank 28, and also an integral tapered seat 30 instead of a separate seat washer. Like the fastener 2, the bolt head 26 includes an end face 26A, a base 26B, and a sidewall portion 26C extending between the end face 26A and the base 26B. The sidewall portion 26C provides a tool engaging portion of the fastener 22. Alternatively, the bolt head 26 could be fabricated with other types of tool-receiving configurations, including security patterns, as described above in connection with the fastener 2.

As best shown in FIG. 5, the shank 28 extends from the bottom of the seat 30 and continues to a terminal end 28A of the shank that defines a second end of the body 4. The shank 28 includes a threaded portion 28B that extends from the terminal end 8A toward the base 6B. The shank's threaded portion 28B is configured to be received in a threaded bore of a fastener installation structure, such as the threaded bore TB of the vehicle hub H in the example vehicle wheel installation shown in FIG. 3. Note that the profiles of individual threads on the shank 28 are not shown in FIG. 5 for ease of illustration. The seat 30 includes an outer surface 30A that is shown as being tapered and generally cone-shaped, but could also be radiused or of other configuration.

As can be best seen in FIG. 5, the body 4 of the fastener 2 may be entirely (or selectively) covered with a chrome-plated coating 32 that is applied using a suitable electroplating technique. Like the coating 12 on the fastener 2, the chrome-plated coating 32 may comprise any desired number of plating layers, including (without limitation) one or more copper and/or nickel underlayers followed by one or more chromium outer layers. Other chrome-plating materials and layer arrangements may also be used. The tapered seat 30 may also be covered with the chrome-plated coating 32 insofar as it is an integral part of the body 4 and the entire fastener 22 can thus be chrome-plated without masking.

Figure 3:
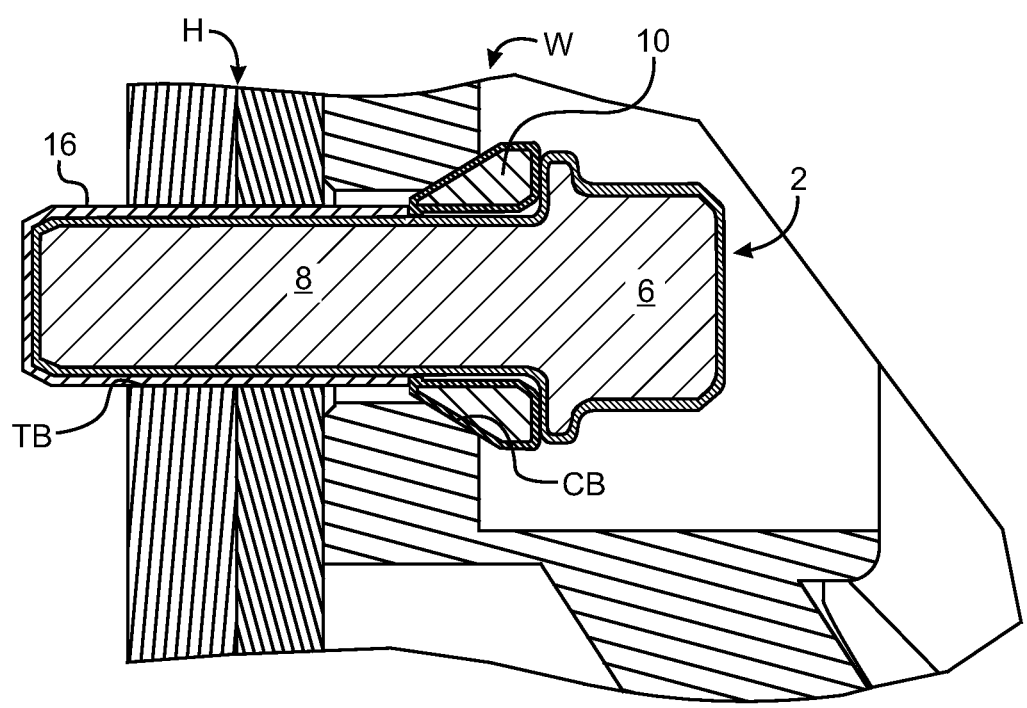
FIG. 3 is a cross-sectional centerline view showing an example bolt fastener installation.

The threaded portion 28B of the shank 28 represents a friction region of the fastener 22 because it is designed to frictionally engage a mating threaded portion of a fastener installation structure, such as the threaded bore TB of the vehicle hub H shown in FIG. 3. During installation and removal of the fastener 22, high friction forces are generated at the fastener's threaded portion 28B due to its sliding contact with the threaded bore as the fastener rotates. The tapered seat 30 also represents a friction region of the fastener 22 because it is designed to frictionally engage a mating counterbore of a fastener installation structure, such as the counterbore CB of the vehicle wheel W shown in FIG. 3. During the final stage of fastener installation and the initial stage of fastener removal, high friction forces are generated on the seat surface 30A due to its sliding contact with the opposing counterbore as the fastener rotates.

The fastener 22 thus includes one or more friction regions that may be subject to large frictional forces. In order to allow the friction region(s) of the fastener 22 to be chrome-plated without causing problems such as galling, seizing and plating wear, at least one friction region (and preferably all such regions) may be coated with an organic composition that is selected to control each region's coefficient of friction. FIGS. 4-5 show a construction wherein both the threaded portion 28B of the shank 28 and the tapered surface 30A of the seat 30 are coated with the organic composition, which is shown by reference number 34. The organic coating 34 may be the same coating described above in connection with the fastener 2.

Figure 6:
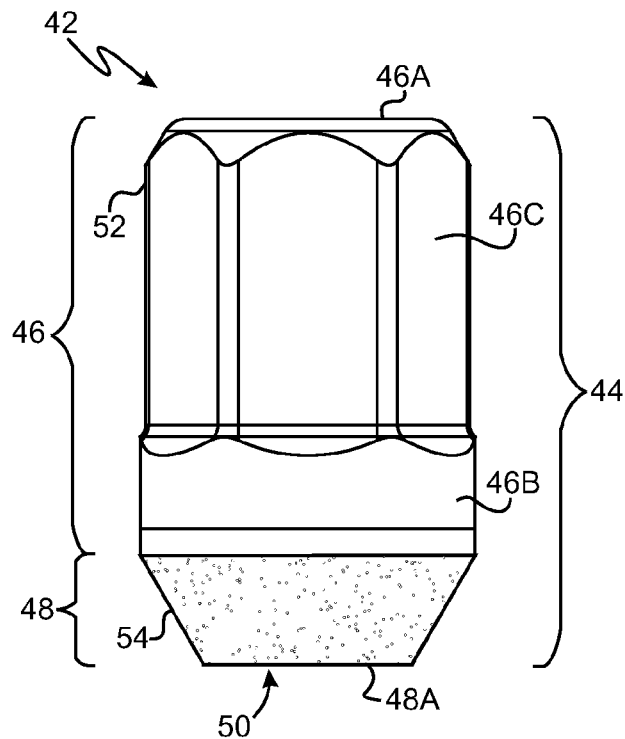
FIG. 6 is a side elevation view showing a nut type of fastener.
Figure 7:
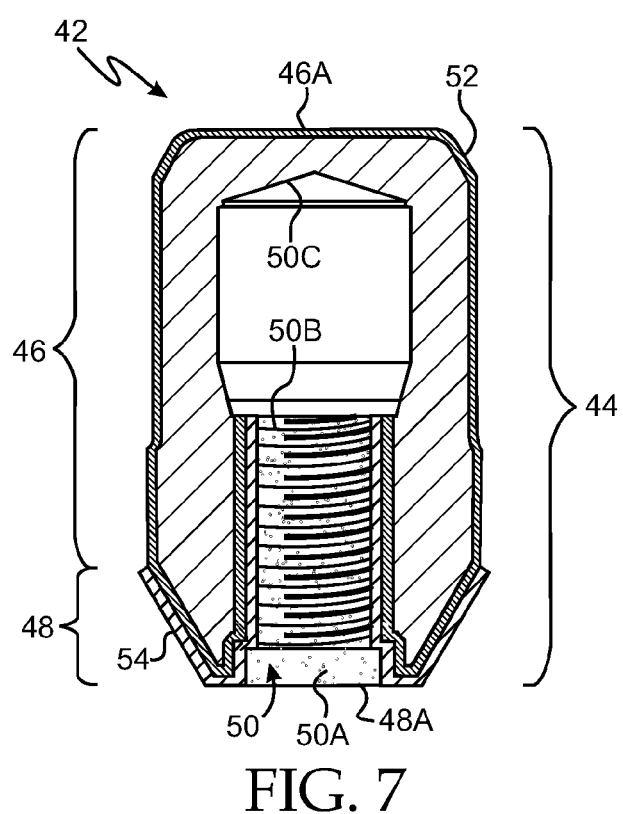
FIG. 7 is a cross-sectional centerline view of the nut fastener of FIG. 6.
Figure 8:
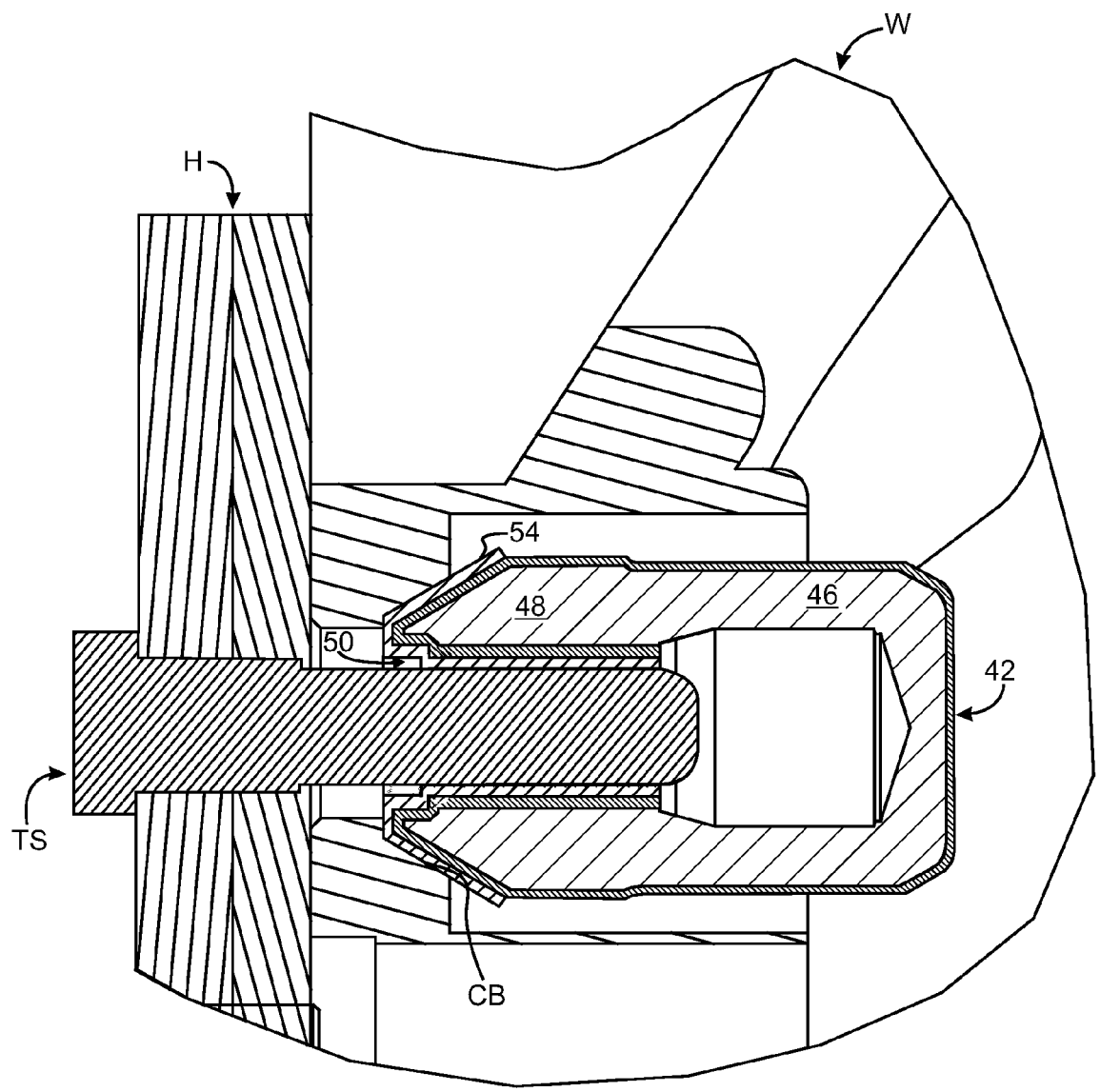
FIG. 8 is a cross-sectional centerline view showing an example nut fastener installation.

Turning now to FIGS. 6-8, a nut-type fastener 42 according to a third example embodiment includes a fastener body 44 having a head 46, a tapered seat 48 and an internal bore 50. The head 46 includes an end face 46A that defines a first end of the body 44, a base 46B, and a sidewall portion 46C extending between the end face and the base. The sidewall portion 46C provides a tool engaging portion of the fastener 42. Alternatively, the nut head 46 could be fabricated with other types of tool-receiving configurations, including security patterns, as described above in connection with the fastener 2.

The seat 48 extends from the base 46B and continues to a terminal end 48A thereof that defines a second end of the body 4. The seat 48 is shown as being tapered and generally cone-shaped, but could also be radiused or of other configuration. As shown in FIG. 7, the bore 50 includes a non-threaded entrance 50A and a threaded portion 50B that extends from the entrance toward a blind end 50C of the bore. The length of the thread pattern is a matter of design choice. The bore's threaded portion 50B is configured to mount onto a threaded stud of a fastener installation structure, such as the threaded stud TS of the vehicle hub H in the example vehicle wheel installation shown in FIG. 8.

As shown in FIG. 7, the body 44 of the fastener 42 may be entirely (or selectively) covered with a chrome-plated coating 52 that is applied using a suitable electroplating technique. For example, the coating 52 may cover the entire fastener exterior, including the head 46 and the seat 48, together with the opening 50A and the threaded portion 50B of the bore 50. Like the coating 12 on the fastener 2, the chrome-plated coating 52 may comprise any desired number of plating layers, including (without limitation) one or more copper and/or nickel underlayers followed by one or more chromium outer layers. Other chrome-plating materials and layer arrangements may also be used.

The threaded portion 50B of the bore 50 represents a friction region of the fastener 42 because it is designed to frictionally engage a mating threaded portion of a fastener installation structure, such as the threaded stud TS of the vehicle hub H shown in FIG. 8. During installation and removal of the fastener 42, high friction forces are generated at the fastener's threaded portion 50B due to its sliding contact with the threaded stud as the fastener rotates. The tapered seat 48 also represents a friction region of the fastener 42 because it is designed to frictionally engage a mating counterbore of a fastener installation structure, such as the counterbore CB of the vehicle wheel W shown in FIG. 8. During the final stage of fastener installation and the initial stage of fastener removal, high friction forces are generated on the surface of the seat 48 due to its sliding contact with the counterbore as the fastener rotates.

The fastener 42 thus includes one or more friction regions that may be subject to large frictional forces. In order to allow the friction region(s) of the fastener 42 to be chrome-plated without causing problems such as galling, seizing and plating wear, at least one friction region (and preferably all such regions) may be coated with an organic composition that is selected to control each region's coefficient of friction. FIG. 7 shows a construction wherein both the threaded portion 50B of the bore 50 and the tapered seat 48 are coated with the organic composition, which is shown by reference number 54. The organic coating may be the same coating described above in connection with the fastener 2.

Figure 9:
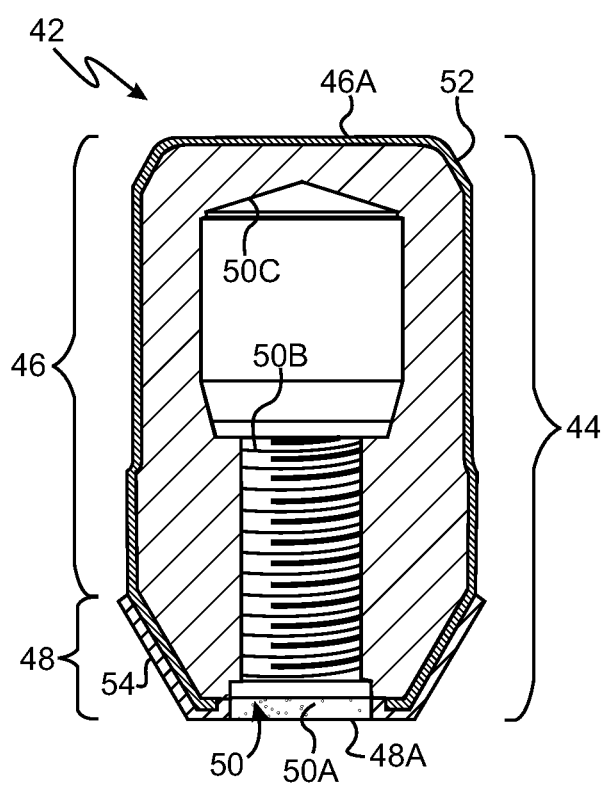
FIG. 9 is a side elevation view showing another nut type of fastener.

Turning now to FIG. 9, an alternative embodiment of the nut-type fastener 42 is shown in which the bore 50 does not receive the chrome plating layer 52. Alternatively, it could be the case that the non-threaded bore opening 50A is the only portion of the bore 50 that receives chrome plating. In this embodiment, the bore's threaded portion 50B may be coated with a lubricious material, such as a zinc-rich composition (not shown). Insofar as the threaded portion 50B of the bore 50 is not chrome plated, it should not require the organic coating 54 (although such is not precluded). The organic coating 54 does cover the tapered seat 48, with potentially some spillover into the non-threaded bore opening 50A.

Accordingly, an organic-coated, chrome-plated fastener has been disclosed. Although various embodiments have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. An organic-coated, chrome-plated fastener, comprising:
a fastener body;
said fastener body having one or more friction regions that are adapted to slidably engage another structure when said fastener is used for fastening;
some or all of said fastener body being chrome-plated with a chrome-plated coating to provide a decorative chrome-plated surface, including at least one of said friction regions;
said chrome-plated coating comprising at least one sublayer containing a micropore-producing solid additive, and a final chrome-plating layer on said sublayer that is microporous due to having micropores produced by said solid additive; and
said at least one friction region that is chrome-plated being covered by a dip-coated, spin-coated or spray-coated organic composition that is heat-cured and chrome-free, and adheres to said microporous chrome-plating layer, while at least one other chrome-plated portion of said fastener body that is not a friction region is uncoated and so as to leave said decorative chrome-plated surface exposed, said organic coating being selected to control a coefficient of friction of said at least one chrome-plated friction region.

2. The fastener of claim 1, wherein said organic coating comprises a cured resin containing a metal particulate and a friction modifier.

3. The fastener of claim 2, wherein said cured resin comprises an epoxy, said metal particulate comprises aluminum, and said friction modifier comprises polytetrafluoroethylene (PTFE).

4. The fastener of claim 1, wherein said organic coating comprises a chrome-free aluminum-rich organic composition designed to be applied to an inorganic zinc-rich basecoat, said organic composition comprising (by weight) 33.0-35.0% propylene glycol monomethyl ether acetate (PMA), 6.0-8.0% polytetrafluoroethylene (PTFE), 4.0-6.0% aluminum, 4.0-6.0% n-butyl alcohol, 3.0-5.0% dimethyl glutarate, 1.0-3.0% magnesium oxide, 1.0-3.0% aromatic petroleum distillate, 0.0-2.0% Stoddard solvent and <1.0% naphthalene.

5. The fastener of claim 1, wherein said organic coating has a thickness of between approximately 0.00008-0.0005 inches.

6. The fastener of claim 1, wherein said organic coating adheres to said at least one chrome-plated friction region at a 5B adhesion strength rating using ASTM D3359-09 Method B adhesion testing.

7. The fastener of claim 1, wherein said fastener is a bolt having a bolt head and a threaded shank, said fastener being entirely chrome-plated, and said organic coating covering a threaded portion of said shank that comprises a chrome-plated friction region.

8. The fastener of claim 7, wherein said bolt further comprises a seat that is either integral on said bolt or mounted on said shank as a seat washer, said seat being entirely chrome-plated and said organic coating covering a portion of said seat that comprises a chrome-plated friction region.

9. The fastener of claim 1, wherein said fastener is a nut having a nut head, a seat and a threaded bore, said head and said seat being chrome-plated and said threaded bore being optionally chrome plated, and said organic coating covering a portion of said seat that comprises a chrome-plated friction region, and said organic coating covering said threaded bore if said threaded bore is a chrome-plated friction region.

10. A method for fabricating an organic-coated, chrome-plated fastener, comprising:
providing a fastener body;
said fastener body having one or more friction regions that are adapted to slidably engage another structure when said fastener is used for fastening;
chrome-plating some or all of said fastener body with a chrome-plated coating, including at least one of said friction regions to provide a decorative chrome-plated surface;
said chrome-plated coating comprising at least one sublayer containing a micropore-producing solid additive, and a final chrome-plating layer on said sublayer that is microporous due to having micropores produced by said solid additive; and
dip-coating, spin-coating or spray-coating said at least one friction region that is chrome-plated with an organic composition that is heat-cured and chrome-free, and adheres to said microporous chrome-plating layer, said organic coating being applied without coating at least one other chrome-plated portion of said fastener body that is not a friction region so as to leave said decorative chrome-plated surface exposed, said organic composition being selected to control a coefficient of friction of said at least one chrome-plated friction region.

11. The method of claim 10, wherein said organic composition comprises a resin containing a metal particulate and a friction modifier.

12. The method of claim 11, wherein said resin comprises an epoxy, said metal particulate comprises aluminum, and said friction modifier comprises polytetrafluoroethylene (PTFE).

13. The method of claim 10, wherein said organic composition comprises a chrome-free aluminum-rich organic composition designed to be applied to an inorganic zinc-rich basecoat, said organic composition comprising (by weight) 33.0-35.0% propylene glycol monomethyl ether acetate (PMA), 6.0-8.0% polytetrafluoroethylene (PTFE), 4.0-6.0% aluminum, 4.0-6.0% n-butyl alcohol, 3.0-5.0% dimethyl glutarate, 1.0-3.0% magnesium oxide, 1.0-3.0% aromatic petroleum distillate, 0.0-2.0% Stoddard solvent and <1.0% naphthalene.

14. The method of claim 10, wherein said organic composition is coated to a thickness of between approximately 0.00008-0.0005 inches.

15. The method of claim 10, wherein said organic composition adheres to said at least one chrome-plated friction region at a 5B adhesion strength rating using ASTM D3359-09 Method B adhesion testing.

16. The method of claim 10, wherein said fastener is a bolt having a bolt head and a threaded shank, said fastener being entirely chrome-plated, and said organic coating covering a threaded portion of said shank that comprises a chrome-plated friction region.

17. The method of claim 16, wherein said bolt further comprises a seat that is either integral on said bolt or mounted on said shank as a seat washer, said seat being entirely chrome-plated and said organic coating covering a portion of said seat that comprises a chrome-plated friction region.

18. The method of claim 16, wherein said fastener is a nut having a nut head, a seat and a threaded bore, said head and said seat being chrome-plated and said threaded bore being optionally chrome plated, and said organic coating covering a portion of said seat that comprises a chrome-plated friction region, and said organic coating covering said threaded bore if said threaded bore is a chrome-plated friction region.

19. An organic-coated, chrome-plated fastener, comprising:
a fastener body;
said fastener body having one or more friction regions that are adapted to slidably engage another structure when said fastener is used for fastening;
all of said fastener body being chrome-plated with a chrome-plated coating, including said one or more friction regions, to provide a decorative chrome-plated surface;
said chrome-plated coating comprising at least one sublayer containing a micropore-producing solid additive, and a final chrome-plating layer on said sublayer that is microporous due to having micropores produced by said solid additive;
said chrome-plated friction regions being covered by a dip-coated, spin-coated or spray-coated organic composition that is heat-cured and chrome-free, and adheres to said microporous chrome-plating layer, said organic coating being selected to control a coefficient of friction of said chrome-plated friction regions;
other chrome-plated portions of said fastener body that are not friction regions being uncoated and so as to leave said decorative chrome-plated surface exposed;
said organic coating comprising a cured resin containing a metal particulate and a friction modifier;
said cured resin comprising an epoxy, said metal particulate comprises aluminum, and said friction modifier comprises polytetrafluoroethylene (PTFE);
said organic coating being a chrome-free aluminum-rich organic composition designed to be applied to an inorganic zinc-rich basecoat that comprises (by weight) 33.0-35.0% propylene glycol monomethyl ether acetate (PMA), 6.0-8.0% polytetrafluoroethylene (PTFE), 4.0-6.0% aluminum, 4.0-6.0% n-butyl alcohol, 3.0-5.0% dimethyl glutarate, 1.0-3.0% magnesium oxide, 1.0-3.0% aromatic petroleum distillate, 0.0-2.0% Stoddard solvent and <1.0% naphthalene;
said organic coating having a thickness of between approximately 0.00008-0.0005 inches; and
said organic coating adhering to said at least one chrome-plated friction region at a 5B adhesion strength rating using ASTM D3359-09 Method B adhesion testing.

* * * * *